Dec. 21, 1937.  E. D. BIERETZ  2,102,781
SELECTIVE GEARING MECHANISM AND AUTOMATIC FLUID CONTROL THEREFOR
Filed May 16, 1935  6 Sheets-Sheet 1

Inventor
Edward D. Bieretz
By H.H. Byrne
Attorney

Dec. 21, 1937. E. D. BIERETZ 2,102,781
SELECTIVE GEARING MECHANISM AND AUTOMATIC FLUID CONTROL THEREFOR
Filed May 16, 1935 6 Sheets-Sheet 2

Inventor
Edward D. Bieretz
By
Attorney

Dec. 21, 1937.  E. D. BIERETZ  2,102,781
SELECTIVE GEARING MECHANISM AND AUTOMATIC FLUID CONTROL THEREFOR
Filed May 16, 1935  6 Sheets-Sheet 3

Inventor
Edward D. Bieretz
By
Attorney

Patented Dec. 21, 1937

2,102,781

UNITED STATES PATENT OFFICE 2,102,781

SELECTIVE GEARING MECHANISM AND AUTOMATIC FLUID CONTROL THEREFOR

Edward D. Bieretz, Baltimore, Md.

Application May 16, 1935, Serial No. 21,893

7 Claims. (Cl. 74—364)

The present invention relates to gear transmissions and automatic controlling means therefor applicable to any and all types of motor driven machinery, and consists in the combinations and arrangements of elements hereinafter described and particularly set forth in the accompanying claims.

The purpose of the invention is to provide a power transmission particularly adapted for motor vehicles, having an automatically controlled gear shifting system without employing the usual gear shifting lever or clutch pedal, and which is operable for automatically selective control of the transmission gears at different speeds, to the end that the car may be operated efficiently and with perfect safety, and at the same time have the benefits of free-wheeling or coasting without incurring any of the factors of unsafety which usually attend the use of the free-wheeling devices now employed; and further wherein the automatic controlling means is regulated by a novel fluid pressure system which derives its power from the source of the engine or movement of the car.

Another object of the invention is to furnish such an automatic controlling mechanism for cars in association with the type of gear engaging transmission described in U. S. Patent No. 1,772,029, dated August 5, 1930 and of which I am a co-inventor.

The present invention also contemplates improvements in the fixed or straight gearing elements or pinions as disclosed in said patent, by substituting therefor spiral pinions whereby to facilitate engagement of the several gear coupling elements or speed changing devices, and which substituted spiral gears also produce a more smooth and quiet operation of the working parts.

The invention is shown by way of illustration in the accompanying drawings wherein.

Referring to the construction in further detail and wherein like reference characters designate corresponding parts in the different figures shown, 20 indicates the engine of an automobile, 21 the engine shaft, 22 the driving shaft, and 23 the driven shaft after the usual manner. The driving shaft 22 is journalled on roller bearings in casing 24 and in like manner is journalled the driven shaft 23 as shown, and the engine end 25 of driven shaft 23 is journalled in a recess bearing 26 of the driving shaft 22. Below these alined shafts is a counter or intermediate shaft 27 journalled in roller bearings 28 of the casing 24 and through the medium of which the shaft 23 is connected to the driven shaft at selective speeds.

Figure 2:
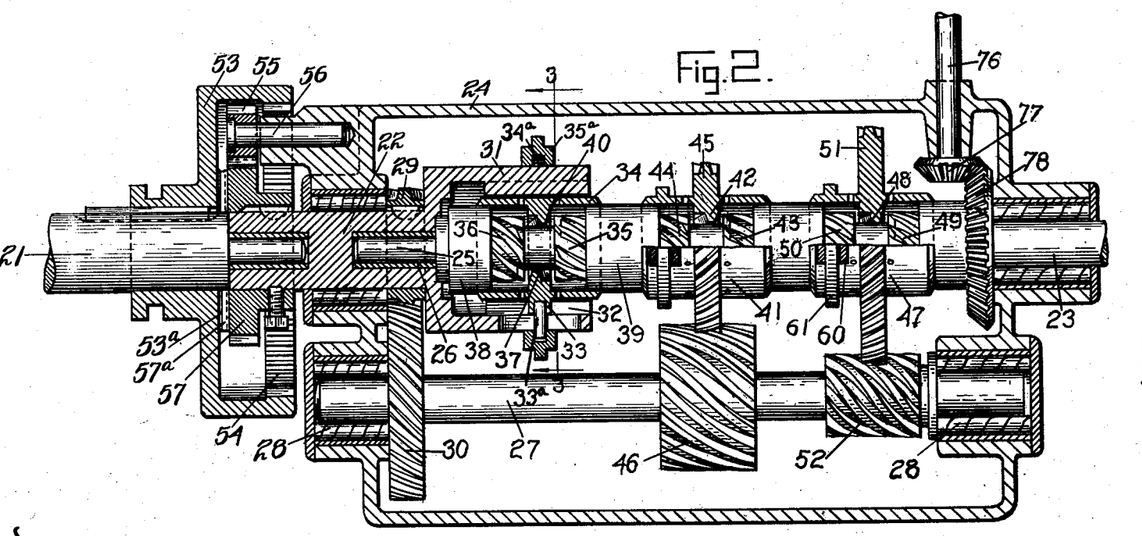
Figure 2 a horizontal sectional view through the transmission.

A spiral gear 29 on driving shaft 22 meshes with a similar and larger gear 30 on shaft 27 which reduces the speed of the countershaft below that of the main or driving shaft, and a cylindrical extension 31 on the driving shaft 22 has axial grooves 32 engaging with lugs 33 on a sleeve like coupling member 34 which always revolves with the shaft extension 31, but is adapted to be shifted along the grooves 32 by means of pins 33a carried by lugs 33 which rotate within an internal groove 34a on shifting ring 35a as shown. The length of grooves 32 is appreciably long so that the lugs 33 on coupling sleeve 34 may freely move therein to permit shifting the gear coupling in both directions. The driven shaft 23 carries thereon three gear coupling devices each having co-operable male and female spiral teeth adapted for selective engagement to impart variable speed to the driven shaft in forward or reverse direction. The coupling for driving the driven shaft directly from the driving shaft comprises male spiral teeth 35 and 36 on driven shaft 23 that are engaged by similar female teeth 37 on the coupling sleeve 34. The male teeth 35 and 36 are spaced apart a distance greater than the width of teeth 37 so that the latter may idle in neutral as shown, and during which the sleeve extensions 34 engage with the two bosses or collars 38 and 39 on shaft 23 as shown in Figure 2.

The purpose of employing spiral clutch elements as distinct from straight or ordinary clutch elements is to facilitate the engagement of the external spline teeth on the driven shaft with the internal spline teeth of the coupling members or gear changing devices in meeting the variable speed change requirements in an automobile or other power transmission. Noiseless gear operation will incidentally result.

It will now be evident that with the coupling sleeve 34 shifted rearwardly, or towards the differential, the cutch element 37 will gradually engage the male clutch element 35 until the rear ends of element 37 abut the boss or collar 39, and with the members 32 and 33 of the shaft extension 31 and coupling sleeve in engagement the driving shaft 22 and driven shaft 23 will now revolve in the same direction and at the same speed. During the gradual engagement of the clutch elements 35 and 37 the rear sleeve portion 34 will move over the boss 39 and as the latter completely fills the sleeve 34 it acts as a piston therefor and such engaging elements form a dash pot. Small apertures 40 are provided in the sleeve portions 34 for the escape of compressed air from the dash pot, or for oil if the gears are run in that medium. As long as the driving shaft 22 and driven shaft 23 are revolving in the same direction and driven from the motor the elements 35 and 37 will remain in engagement and on account of their pitch the coupling member will be held hard against the boss 39 and there will be no strain on the shift gear. However, should the speed of the main shaft 22 be slowed down below the speed of the driven shaft 23, as when going down grade, then the forces acting on clutch elements 35 and 37 will act to release and disengage them from each other, that is to say, there will result a shifting of the coupling member 34 forward and into neutral position as shown in Figure 2. It will thus be seen that whenever the motor is slowed down the coupling is automatically disengaged even with the clutch in engagement thereby giving free wheeling. If thereafter the coupling member 34 is moved further forward, or to the left of the position shown, the female teeth 37 will engage with the male teeth 36 on driven shaft 23 and the engine will then act as a brake or cooperate with the wheel brakes to stop the car or retard its speed. In either event both shafts continue to run in the same direction until the car has stopped.

The driven shaft 23 is also provided with a coupling device 41 for second speed which has female teeth 42 for engaging with male teeth 43 or 44 accordingly as the shaft 23 is connected to be driven from the motor, or overrides the driving shaft 22 when it automatically uncouples such engagement and becomes coupled with teeth 44 and effects a braking action after the manner described above respecting the engagement of clutch elements 35, 36, and 37. The coupling member 41 has spiral teeth 45 in mesh with a spiral pinion 46 on countershaft 27. In like manner a coupling device 47 has female teeth 48 that engage with male teeth 49 or 50, and carries a spiral gear 51 meshing with a similar pinion 52 on the countershaft 23.

The "forward" coupling between the engine shaft 21 and the driving shaft 22 consists of a gear 53 slidably keyed on shaft 21 and having radial teeth 53a which mesh with similar teeth 57a on the face of gear 57 that is fixed on shaft 22, thereby effecting a direct connection between shafts 21 and 22.

A reversing device consists of the gear 53 on engine shaft 21 having internal teeth 54 that mesh with a small pinion 55 journalled within the space or housing of gear 53, on stub shaft 56 secured to gear casing 24 and said gear 53 is in engagement with the larger pinion 57 on shaft 22 through the medium of small pinion 55.

The foregoing describes the essential elements and manner of operation of the variable speed gearing and for a more detailed description thereof and its elements and manner of working reference may be had to my U. S. Pat. No. 1,771,029 above referred to. The present construction is characterized in that it includes a reverse gear element and employs spiral gears in lieu of straight gears for the purpose stated.

Figure 1:
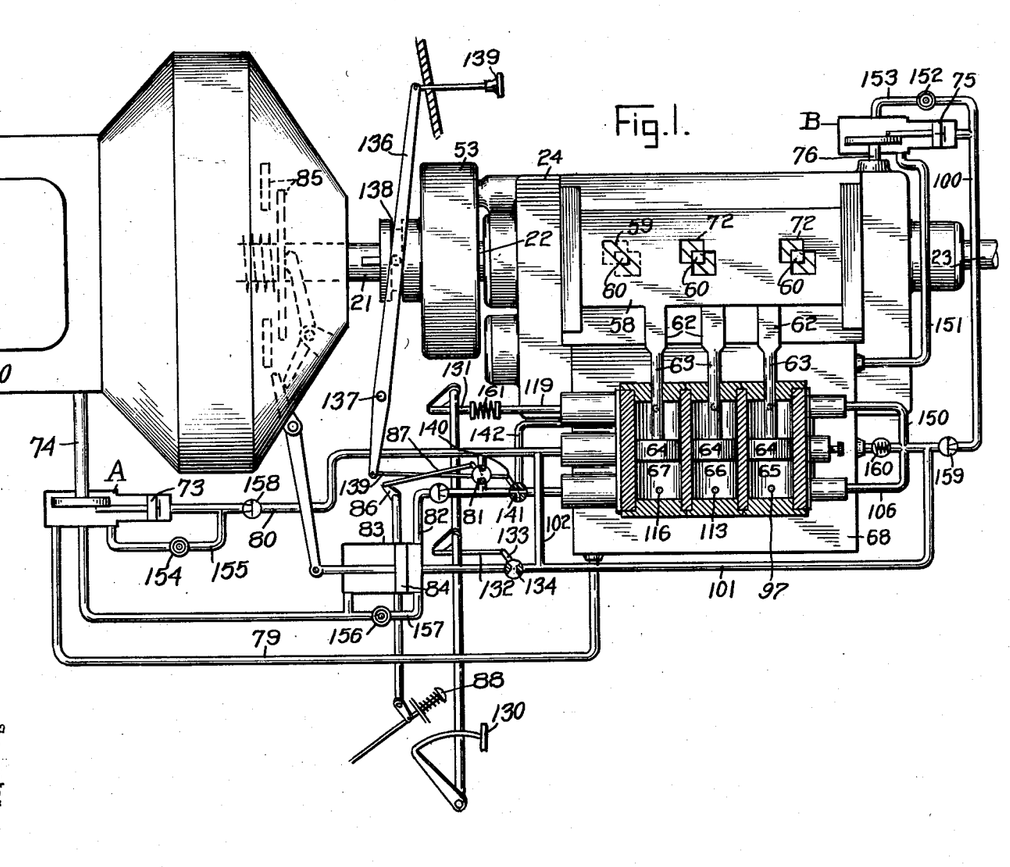
Figure 1 is a diagrammatic view or lay-out of the system and mechanism as applied to the engine and transmission of an automobile.

The several coupling devices 34, 41, and 47 are adapted to be shifted axially to bring into engagement their respective male and female clutch elements by means of plates 58 having each a diagonally disposed slot 59 engaging with a key 60 that connects with an annular ridge or collar 61 on the sleeve of each coupling member, said plates 58 having extended portions or arms 62 that connect with rods 63 of pistons 64 working in cylinders 65, 66, and 67, and thus for each key shifting plate 58 or coupling there is a corresponding cylinder (see Figure 1). That is to say, there is one such piston and cylinder associated with each of the keys 60 for shifting the gear coupling devices, to wit; 64—65 for first speed, 64—66 for second speed, and piston and cylinder 64 and 67 for high speed.

Figures 3, 4, 5, 6, 7, 8, 9:
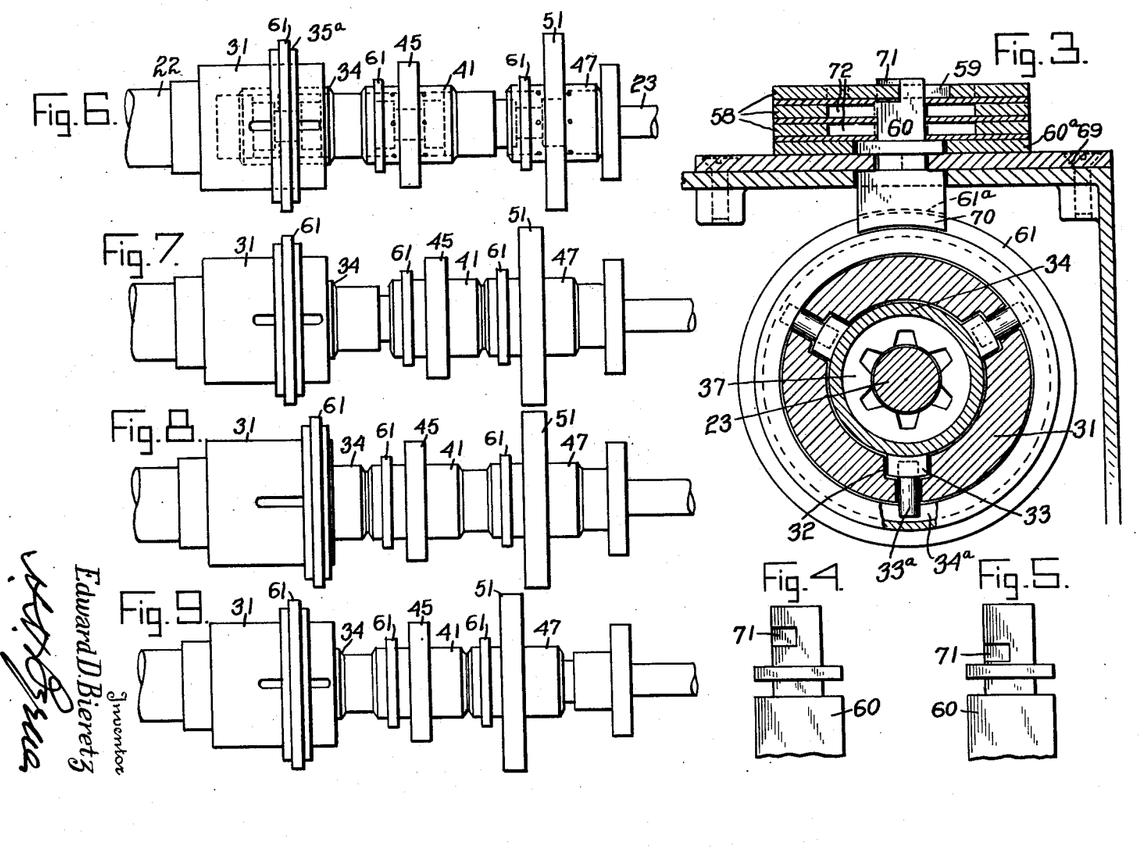
Figure 3 a vertical section on the line 3—3 of Figure 2, showing the shifting post for high gear.
Figures 4 and 5 are details of the shifting posts for second and first gears.
Figure 6 a top plan view of the transmission gears set for first speed forward.
Figure 7 a similar view with the gears set for second speed forward.
Figure 8 a like view with the gears set for high speed.
Figure 9 shows another view of the gears wherein the low speed gear is set so the engine is being braked in forward speed or the vehicle is being driven in low speed reverse drive.
Figure 10:
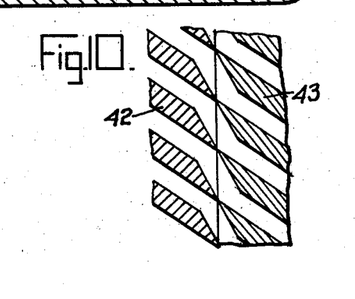
Figure 10 a detail development of the spiral gear coupling.
Figures 12, 13, 14, 15:
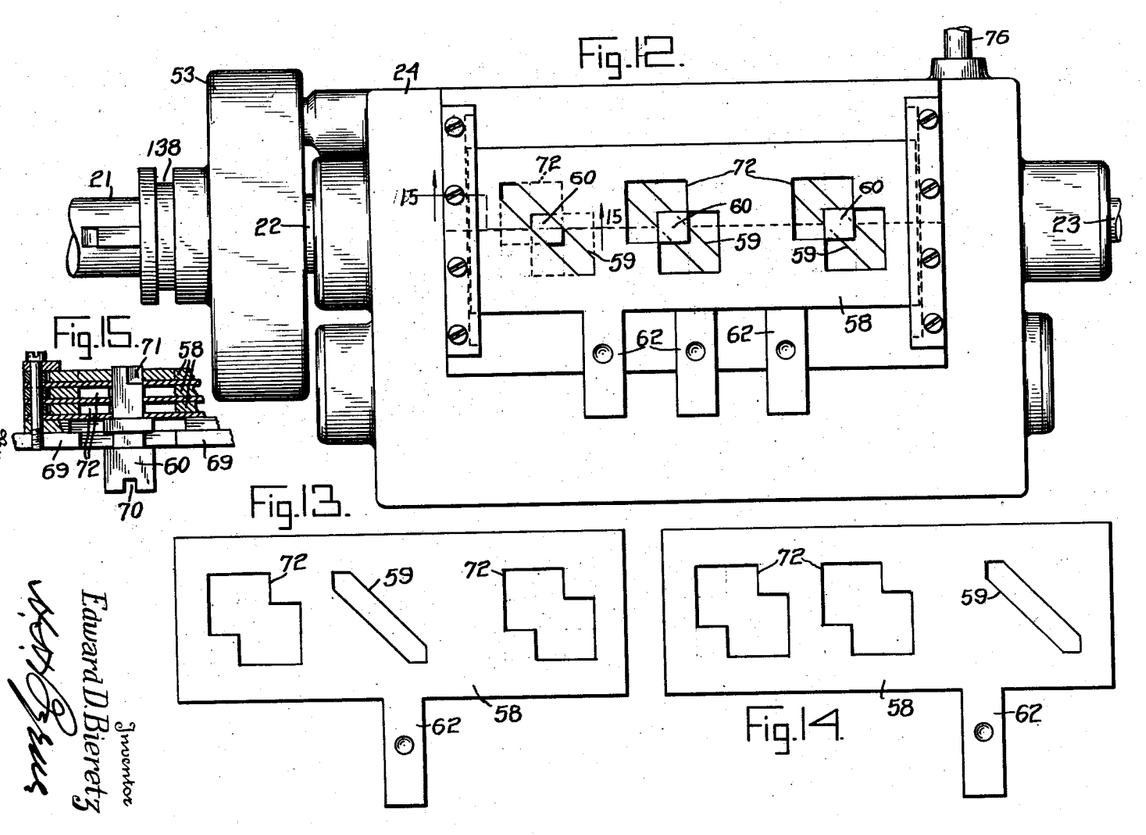
Figure 12 a plan view of the transmission showing the high gear shifting plate in neutral position.
Figures 13 and 14 plan views of the second and first gear shifting plates.
Figure 15 a detail section taken on the line 15—15 of Figure 12.
Figure 16:
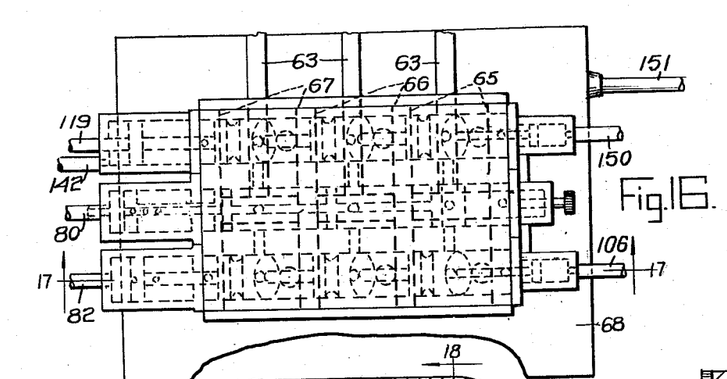
Figure 16 a plan view of the shifter-plate control valves.
Figure 17:
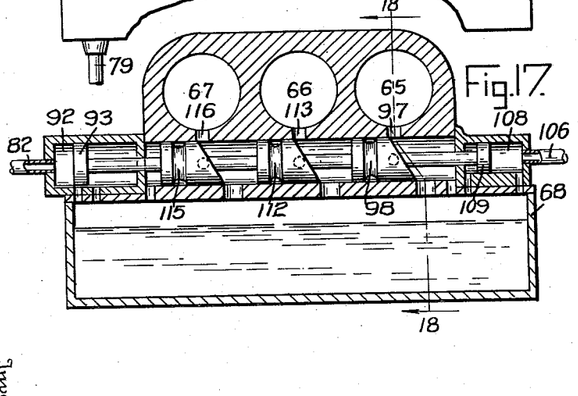
Figure 17 a section through one of the control valves taken on line 17—17 of Figure 16.
Figure 18:
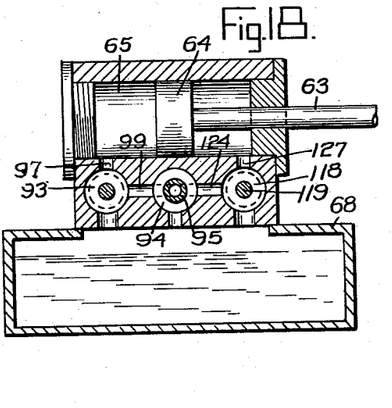
Figure 18 a longitudinal section on the line 18—18 of Figure 17.
Figure 19:
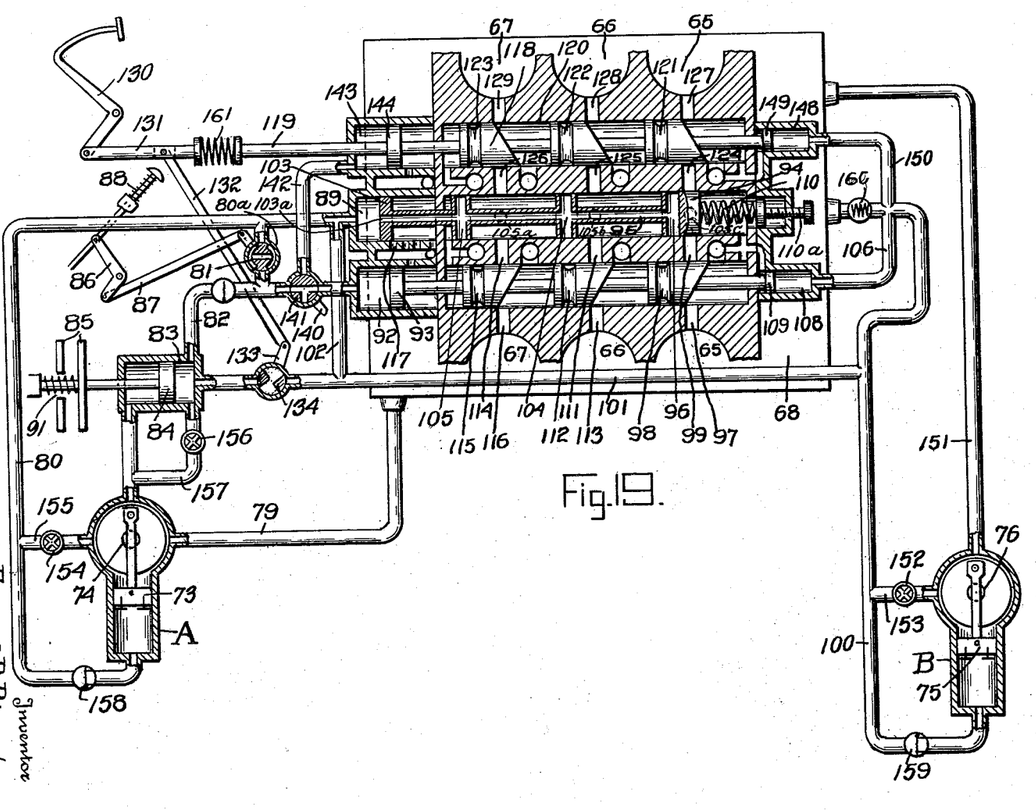
Figure 19 a diagrammatic development of the piping connecting all elements of the mechanism.

The three coupling shifting devices (Figures 2, 3, 4, 5, 12, 13, 14, and 15) consist of keys 60 mounted to have limited sliding movement on plate 69 secured to the head of the casing 24, and each formed with a head 70 that engages with the collar 61 of the coupling member. The three keys are suitably notched, as at 71, to engage with the angular slots 59 of the plates 58 which are assembled in spaced and super-posed relation on plate 69 as indicated in Figures 3 and 15. Each plate 58 is also provided with two openings 72 that receive the keys 60 of the other two or inactive plates (Figures 12, 13, and 14) so that said inactive keys and their respective coupling devices are locked or held against movement when its own key 60 is functioning to establish its respective gearing connection, as indicated in Figures 13 and 14.

Mounted on the engine casing is a fluid reservoir 68 comprising a rectangular metal box having a closure secured thereto consisting of a casting welded or otherwise affixed to its walls. Within the casting are three parallel cylinders 89, 92 and 143 in which a multiple control piston 103 and two throttling valve pistons 93 and 144 are moved. Three ports 105a, 105b, and 105c communicate with the reservoir 68 through the wall of the middle cylinder 89. Two sets of three ports each are spaced about ninety degrees on either side of the ports 105a, 105b and 105c. One set 99, 111 and 114 communicates with throttling valve cylinder 92 and the other set 124, 125 and 126 is in communication with throttling valve cylinder 143. Within the same casting, at right angles and in spaced relation to cylinders 89, 92 and 143, are the piston cylinders 65, 66 and 67 which communicate by ports 97, 113 and 116 with one side of the piston cylinders 64, the ports 127, 128 and 129 communicating with the other side of the pistons 64 within these cylinders. In cylinder 89 a multiple control valve piston having a tubular stem 95 is adapted to be moved by the action of fluid on the piston head 103 which has an opening 103a through which oil may pass to ports 96, 104 and 105. The forward end of the tubular stem 95 is closed by a piston head 94 which bears against a spring 110 whose tension is controlled by an adjusting screw 110a which is screwed through the forward end of the casting.

The ports 96, 104 and 105 of the multiple control valve piston 103 during its forward movement successively communicate with ports 97, 111 and 114 in the walls of the cylinders 89 and 92.

Operating within cylinder 92 is a throttling valve piston 93 carrying a multiple set of valves 98, 112 and 115 connected together by a shaft. Said valves are cylindrical in shape with an annular valve groove near one end and whose other ends have an angular face. On the forward end of the valves connecting shaft is a small compensating piston 109 operating in a cylinder 108. Operating in cylinder 143 is a set of throttling valves 121, 122 and 123 similar to valves 98, 112 and 115 having a large piston head 144 connecting with a rod 119 having a spring coupling 161 which is adapted to be operated by means of a brake pedal 130 through a rod 131 connected to the other side of coupling spring 161. On the forward end of this throttling valve piston 144 is a small compensating piston 149 operating within cylinder 148.

When fluid pressure operates the multiple control valve piston head 103, fluid enters the tubular stem 95 and its ports 96, 104 and 105 and said valve is forced forward against the tension of spring 110 bringing port 96 into registration with port 99. At the same time fluid pressure is admitted to cylinder 92 and forces the throttling piston head 93 forward so that annular grooves 98, 112 and 115 register with ports 99, 111 and 114 causing fluid to flow through ports 96, 99, 94 and 97 to operate piston 64 in cylinder 65 shifting plate 58 forwardly thereby shifting key 60 in such a manner as to cause first gear coupling member 47 to be shifted rearwardly allowing driven shaft 23 to operate the vehicle at low speed. Increased pressure of fluid will move multiple control valve piston 103 forwardly allowing port 104 to register with port 111 sending fluid around the annular groove 112 into port 113, thus operating piston 64 within cylinder 66 shifting another plate 58 so as to force gear coupling member 41 rearwards causing driven shaft 23 to operate the vehicle at an intermediate speed. This action causes clutch elements 49 to be revolved faster than gear member 47 and due to the peculiar construction of the gear teeth 49 causes coupling member 47 to be moved forward into neutral. This return to neutral movement of coupling member 47 forces key 60 to operate in a diagonal slot in plate 58 in such a manner that it exerts a force against piston 64 so as to force the fluid from the cylinder 65. When the increased pressure of the fluid system operated to change the speed of the vehicle from low to intermediate gear, port 96 was carried beyond port 99 cutting off the pressure from the piston 64 in cylinder 65. This reverse pressure caused by the gear coupling member 51 will now force fluid back from cylinder 65 through port 97, around annular groove of valve member 98 into port 99 and in the space between the forward two ports 96 and 104 on tubular stem 95 causing fluid to return to reservoir 68 through opening 105c. Increased speed of the vehicle caused by the intermediate gear being connected will now increase the fluid pressure against piston head 103 bringing ports 105, 114, annular groove 115 and port 67 into registration causing piston 64 in cylinder 67 to be shifted thereby moving high speed gear coupling member 34 into engagement with driven shaft 23. Piston 64 within cylinder 66 is allowed to return to original position by movement of coupling member 41 into neutral in a similar manner as previously described for coupling member 47.

The multiple control valves and multiple throttling valves are adapted to function in accordance with the degree of fluid pressure generated by the two pumps A and B. Pump A is connected to reservoir 68 by a conduit 79, and pressure is communicated from pump A to piston 103 by means of conduit 80, and connected to conduit 80 is branch conduit 80a which in turn connects with second conduit 82. The conduit 80a has a rotatable valve 81 connected to accelerator pedal 88, by crank and link connection 86 and 87, and adapted, when said pedal is in the position corresponding to idling of the motor to shut connection between conduit 80 and conduit 82, and further adapted, when said pedal is moved to a position corresponding to increased speed of motor, to connect said conduits 80 and 82.

The conduit 82 has connection with cylinder 83 and accordingly acts to supply pressure back of piston 84 to force clutch plates 85 into engagement and maintain them in such engagement when the accelerator pedal is in any position above the idling speed of the motor. At its other terminal conduit 82 is connected to cylinder 92 to supply fluid pressure back of piston head 93. In conduit 82 is a three way valve 141, operatively connected to the reversing mechanism 139. Said valve 141 acts in one position to permit fluid to pass through conduit 82 to cylinder 92, and in a second position determined by the reversing mechanism, to supply fluid pressure from conduit 82 to cylinder 143.

Pump B driven from shaft 23 of the transmission is connected to the reservoir 68 by conduit 151. A conduit 100 acts to supply fluid pressure from pump B to secondary conduit 150 and 106 respectively connected to cylinders 148 and 108, and also is connected by a relief valve 160 to reservoir 68. Fluid pressure in the branch conduits 106 and 148 acts against pistons 109 and 149, in cylinders 108 and 148 respectively, to return multiple throttling valves 93 and 144 to their normal inoperative position when fluid pressure is decreased against the piston heads 93 and 144.

The conduit 100 is connected by branch conduit 101 to cylinder 83 to supply fluid pressure against piston 84 to maintain the clutch plates 85 in engagement when the brake mechanism is applied. From the conduit 101 a branch conduit 102 extends to conduit 80 at the point where the latter connects with cylinder 89 for the purpose of supplying fluid pressure from pump B and piston 103. A valve 134 in conduit 101, serves when brake pedal 130 is applied, to admit pressure from pump B to cylinder 83 of piston 84 holding clutch 85 in engagement, and arm 133 of said valve connects with brake pedal by link 132.

The piston 103 of the multiple control valve and pistons 93 and 144 of the two multiple throttling valves, are connected by pipes to be operated by pumps A and B as shown. Thus pipe line 79—80 connects pump A with tank 68 and cylinder 89, and pipe 82 leading from by-pass 80a of pipe 80 admits pressure to cylinder 83 to move piston 84 for effecting connection between clutch elements 85. A valve 81 in pipe 82 is connected to the accelerator pedal 88 by crank and link connection 86 and 87, and a valve 141 in pipe 82, when open, admits pressure into cylinder 92 of the multiple throttle valve piston 93. Pump B has pipe connection 151 with tank 68 and the pipe line 100—101—102 leads from pump B to cylinder 89 of the multiple valve control piston 103; and pipe 100 also has connections 106 and 150 leading to cylinders 108 and 148 of counterbalancing pistons 109—149 of the two multiple throttling valves. A valve 134 in pipe 101, serves when brake pedal 130 is applied to admit pressure from pump B to cylinder 83 of piston 84 holding clutch 85 in engagement, and arm 133 of said valve connects with brake pedal by link 132. A reversing valve 141 in pipe line 82—142 serves to admit pressure into cylinder 143 against piston 144 when the transmission gearing is thrown into reverse.

The functioning of the system for shifting the first or low speed coupling 47 is substantially as follows: Assuming the car and motor are at rest, the motor after starting will be accelerated in the conventional manner by pressing against the accelerator pedal 88, whereupon pump A will instantly begin to operate, causing oil to flow through pipe line 79—80 through valve 81, tube 82 into clutch cylinder 83 moving piston 84 to connect clutch elements 85. The lever and link connection 86—87 having opened valve 81 when the pedal 88 was depressed, simultaneously with the above, pressure enters cylinder 89 moving piston 103 carrying the multiple control valve (96—104—105) and also through reversing valve 141 into cylinder 92 moving piston 93 carrying multiple throttling valve (98—112—115) bringing ports 96, 98 and 99 into communication. The throwing in of the clutch causes rotation of shafts 21 and 22 and with increasing pressure in cylinder 89 the multiple valve piston 103 is moved, bringing its tubular stem 95 and port 96 into communication with cylinder port 99, throttle valve 98 and port 97 leading into the cylinder 65. Thus the several ports 96, 99, 98, and 97 are all brought into communication substantially at the same instant by pressure in cylinders 89 and 92. With sufficient pressure thus established in cylinder 65, the coupling device for producing first speed of the driven shaft 23 is brought to function and driven shaft 23 starts to rotate whereupon pump B is operated causing oil to flow through the conduits 100, 101, and 102, thus further increasing pressure within multiple piston cylinder 89 against piston 103 carrying the multiple valves 96, 104 and 105, and also the flow of oil through conduits 100, 106, into small cylinder 108, producing pressure against piston 109 which partly counterbalances the pressure against piston 93. This pressure against piston 109 makes multiple throttling valves 93 sensitive to any slight decrease of pressure entering cylinder 92 and will move these valves rearwardly due to a decrease of pressure in cylinder 92 taking the grooves 98, 112 and 115 out of registry with ports 97, 113, 116, 99, 111 and 114. It will therefore be seen that as the three pistons 64 are actuated their corresponding gear shifting devices are automatically moved into and out of engagement, and that the disengaging operation of each coupling device moves its corresponding piston into neutral position. The several valve ports 96, 104, and 105 of the piston 103 are so positioned with respect to cylinder ports 99, 111, and 114 that when ports 96—99 are in communication ports 104—111 and 105—114 do not register, and when ports 104—111 are in register, ports 96—99 and 104—111 are closed, and also when ports 105—114 communicate, ports 96—99 and 104—111 are closed. Thus the movement of multiple valve pistons 103 and 93 serve to establish communication in the three cylinders 65, 66, and 67 successively in that order.

The cylinder 89 is provided with a series of ports or vents 117 which serve to progressively relieve the pressure against multiple valve piston 103 whereby to permit said piston valve to function commensurate with the increasing pressure produced by engine pump A which is controlled directly by the speed of the driving shaft 21. The spent oil passes through the several ducts 117 and into the reservoir 68. The relief openings 117 are so arranged that the relief in each instance is subject to regulation thus permitting the speeds at which low, second and high gears of the transmission are engaged to be regulated. The spacing between said openings is in accordance with the required movement of piston 103 for admitting pressure to low, second and high gear operating cylinders.

If it is desired to slow the vehicle's speed at any time it is only necessary to press on brake pedal 130 forcing rod 131 forwards against coupling member 161 which forces rod 119 forward until the grooves of throttling valves 121, 122 and 123 are in registration with ports 127, 128 and 129. As the brake pedal 130 is pushed down by the operator's foot, a link 132 coupled to valve 134 is revolved to admit fluid from pump B through lines 100 and 101 into clutch piston cylinder 83. This serves to keep the clutch plates 85 in engagement and at the same time releases a little pressure from cylinder 89. When the annular grooves of valves 121, 122 and 123 were lined up with ports 127, 128 and 129 they were also in registration with ports 124, 125 and 126. As port 105 of tubular stem 95 is in registration with ports 126 and 114, fluid will now flow into ports 126, groove 123 and port 129, into piston cylinder 67 which now forces piston 64 downwards, shifting plates 58, moving key 60 of clutch member 34, forcing said member into neutral and then forward so gear elements 36 and 40 mesh, thus powerfully braking the speed of the vehicle to that of the engine.

As the engine speed falls pressure of pump A falls too, decreasing pressure in cylinder 89 of multiple control valve 103, causing valves 103 to move rearwardly by action of spring 110, bringing port 104, annular groove 122 of multiple throttling valves 118 and port 125 into registry, thus admitting fluid pressure to piston cylinder 66, shifting plate 58, key 60 and coupling member 41 from neutral into a forward position, thus retarding the speed of the vehicle in intermediate gear. Likewise due to still further decrease of fluid pressure in cylinder 89, port 96 of valve 103 is brought into registry with ports 124, 121 and 127 admitting fluid pressure into piston cylinder 65, moving plate 58 and key 60, causing coupling member 47 to move rearwardly thereby braking the engine in first speed.

This braking effect takes place in any gear, either in forward or reverse speed, entirely under selection of the operator.

In order to drive the car in reverse there is provided a push rod 135 connected with a lever 136 fulcrumed at 137 and engaging with collar 138 on the reversing gear 53. A link 139 connects lever 136 with arm 140 of the valve 141 which in operation establishes pressure communication from pump A through tube 142 into the cylinder 143 against piston 144 which then moves rod 119 successively to communicate valves 121, 122, 123, successively to communicate with ports 127, 128, and 129 creating the desired pressures within the piston rod sides of cylinders 65, 66, and 67 respectively. The pistons 64 then shift the three keys 60 with gear couplings to establish gearing connections in reverse direction.

The reverse or brake throttling valves 121—122—123 are also provided with a smaller and counter-pressure cylinder and piston 148—149 which communicates through pipe 150 with the pressure side of pumps A and B through pipes 80, 102, 101 and 100 and in this respect the purpose and function of the piston 149 is the same as that of counterpressure piston 109 on the first throttle valve. The pump B operated from the driven shaft 23 has connection 151 with the reservoir 68 and is provided with a regulating valve 152 in pipe 153 connecting with pipe 100. In like manner a regulating valve 154 in pipe 155 is provided for pump A, and a second regulating valve 156 is located in pipe 157 between pump A and the pump cylinder 83. Each of the pumps A and B has a suitable check valve (158 and 159) which functions in the usual way.

In the various functionings of the system the several coupling elements are moved to the different positions as shown by diagram in Figures 6, 7, 8, and 9 to wit: In Figure 6 the driven shaft is connected for first or low speed, in Figure 7 the parts are connected for second speed, and in Figure 8 the driving and driven shafts are coupled direct for high speed. In these views the car is traveling in the forward direction under power from the motor and the male and female clutch elements are in driving positions. Figure 9 shows the parts when in first or low gear position with the speed of the motor retarded to less than that of the driven shaft, which causes the low gear elements to establish connection for retarding the speed of the car through the medium of the motor acting as a brake or for reverse motion of the car when the reversing gear is engaged.

Résumé

This system provides for selective control without the aid of the usual gear-shift lever and clutch pedal to automatically and effectively change the transmission gears at proper speed and in all respects the car will operate with perfect safety and at the same time possess the benefits of free-wheeling or coasting without incurring any factors of unsafety which are connected with ordinary free-wheeling devices now in use. Thus, after the motor has been started the driver simply applies pressure to the accelerator pedal, the clutch is engaged and the machine automatically goes into low gear and as the speed of the car increases, gear changes are effected so that at the proper speed, the second gear will come into engagement and low gear will disengage. By the same method of operation as the speed increases the high gear will come into engagement and the second gear will disengage. When the desired speed is reached and the grade conditions are satisfactory, the driver can release pressure on the accelerator pedal and the automobile will free-wheel, or coast without resistance from engine compression. If the speed decreases below that point at which the mechanism is set to engage high gear, and the driver again applies pressure to the accelerator, second gear will come into engagement, or if the speed is decreased below the speed for which second gear engagement is provided and pressure is applied to the accelerator, low gear will come into engagement. On the other hand, if while the automobile is free-wheeling or coasting, the speed increases and for any reason the driver applies pressure to the brake pedal he brings the wheel brakes into action and the engine into gear engagement with the differential through the gear that should be engaged for the speed at which the automobile is traveling. If this be high gear when pressure is applied to the brake pedal, or if it be second gear and pressure is maintained on the brake pedal, the next succeeding lower gear will come into engagement after the speed of the automobile has sufficiently decreased. If in an emergency the driver applies pressure to the brake pedal and maintains pressure thereon, the automobile will have the benefit not only of the braking effect of the engine compression when the engine is in high gear, but will automatically receive the benefit of engine braking effect through second and low gears until the engine is stopped or the speed reduced to that desired. Also when the car is going down grade the driver need only snub the brakes to bring the desired gear into engagement and then can release pressure from the brake pedal and braking effect will be maintained through the gear that is engaged. This avoids necessity of constant brake lining wear. If speed down hill increases and the driver desires the car to operate through a still lower gear, it is necessary only to again snub the brakes, and if it is desired to again coast, it is necessary only to momentarily apply pressure to the accelerator pedal. If the driver desires to increase speed and applies and maintains pressure on the accelerator pedal, the gears will automatically come out of braking engagement and enter pulling engagement beginning with the gear determined by the speed of the automobile and engaging high gear as the speed of the automobile increases. All the foregoing described operating benefits are enjoyed without the use of a gear shift lever or clutch pedal.

When the automobile is in operation and the driver desires to free-wheel or coast, he removes pressure from the accelerator, causing the motor to idle and valve 81 to close, thus removing pressure from clutch operating cylinder 83, allowing the clutch to be disengaged and at the same time removing pressure from cylinder 92, allowing the pressure created through the operation of pump B and applying pressure in cylinder 108 to cause valve 93 to move to the left and relieve pressure in forward operating end of cylinders 65, 66, and 67. The combined effect of the splines on driven shaft 23 of the transmission and the helical or spiral gears on the auxiliary shaft 27 cause whatever gear was engaged to back off into neutral position by reason of the driven shaft 23 being rotated through the forward motion of the automobile, while the auxiliary shaft of the transmission has no rotating means.

When the automobile is in motion and the driver applies pressure to the brake pedal 130, valve member 144 is mechanically moved to the right while at the same time, through connecting link 132, valve member 134 is opened and pressure from pump B is applied to cylinder 83, and the clutch plates 85 are engaged while pressure from the pump B is admitted to cylinder 89 and through ports of valve 95 to the braking end of brake operating cylinders 65, 66, 67 which causes the gear to become engaged that is proper according to the speed of the automobile.

Check valve members 158 and 159 are for the purpose of preventing oscillation of the fluid in the pressure lines resulting from the under speed operation of either pump when the other pump is in operation. Check valve in pipe 82 is for the purpose of preventing pressure passing from cylinder 83 through tube 82 and valve 141 into cylinder 92 and thereby causing valve 93 to be moved into forward operating position when the brake pedal is applied.

Regulating valve 156 is for the purpose of controlling pressure in cylinder 83 in proportion to the tension of the clutch spring so that the speed with which clutch engagement occurs can be regulated without the aid of a dash-pot arrangement.

Safety valve 160 is primarily for the purpose of preventing excess pressure in the pressure tubes and operates by providing relief from either pump into the reservoir 68 accordingly as the safety valve is set. Incidently, however, the adjustment of safety valve 160 in combination with adjustment of the relief from ports 117, will provide a finer adjustment of exact speeds at which low, second and high gears respectively will engage. And a spring 161 between the shafts 131 and 119 allows for the instantaneous motion of valve 118 to the right when the brake pedal is applied without interfering with the full motion of the brake pedal itself. This automatic arrangement provides for the clutch being engaged whenever the power of the motor is required for motion of the automobile or whenever the compression of the motor is required as an aid to the automobile brakes, while at the same time, through the clutch spring being used to keep the plates disengaged, the motor is not connected to the differential of the automobile when power is not required or when engine compression is not required to aid in braking.

The clutch engagement provided for herein permits a gradual contact of clutch plates not possible through human touch or foot pressure and at the same time clutch engagement is absolutely certain through either rotation of the engine, or motion of the automobile, provided either the accelerator or the brake pedal are subjected to operating pressure. Pressure applied to the brake pedal assures connection of the automobile differential with the engine through whatever gear should be in use depending upon the speed of the automobile. Pressure on the accelerator assures connection of the differential with the engine through whatever gear is proper according to the speed of the car. Absence of pressure on either accelerator or brake pedals assures free-wheeling or coasting. In this manner an automatic shifting of the gear occurs without the aid of a clutch pedal or shifting lever, and the speed at which the automatic changing of gear occurs is subject to adjustment in accord with the desire of the operator, while at the same time, all the benefits of free-wheeling are possible of enjoyment without any of the risks in connection with ordinary free-wheeling that result from inability to use the engine compression as an aid to the brakes or in other words, the automobile is always under control and the benefits of coasting are provided. It will therefore be seen that when there is no pressure on the brake pedal and/or accelerator pedal there is no pressure exerted to apply the clutch.

The automatic operation through this system and apparatus is capable of such fine adjustments as to provide for the practical and dependable disengagement of a high gear and engagement of a lower gear when the engine speed is reduced through grade, load or road traction—without any attention or effort on the part of the driver. This occurs—when the proper adjustments are made to provide therefor—as a result of the automobile moving at low speed and the engine rotating at low speed and the pumps operating in combination not furnishing enough pressure on piston 84 to keep clutch plates 85 engaged causing the pump speeds to be lowered, and reduced pressure in cylinder 89 permitting tension on spring 110 to move valve 94 to the left or lower gear operating position. And at the same time the gear in operation in the transmission backs into neutral position during the momentary release of clutch 85 due to the momentum of the car in combination with the transmission brake. The release of the clutch then permits the engine to speed up causing the pressure generated in pump A to supply pressure again to cylinder 83 and valves 94 and 93. All this occurs momentarily and the automatic change to lower gear under a too heavy load is made so rapidly as to leave no marked or noticeable effect on the momentum of the car during the instantaneous change of gears. The combined adjustment of tension on spring 110 together with the adjustment of pressure relief valves 154 and 152 and the relief through ports 117 can be made so that if the engine gets down to a certain speed while pulling, high gear will disengage and second gear will engage, or if while pulling in second gear the speed of the automobile is reduced, second gear will disengage and low gear will come into engagement or when pulling in low gear if the speed of the automobile is too low even low gear will disengage. At the same time if the automobile operator does not desire the automobile's speed to be reduced to such low speed, he can produce the same result with respect to any of the gears by momentarily releasing pressure on the accelerator pedal and instantly reapplying pressure.

When the reverse gear is in and valve 141 in the reverse position, the operation of the accelerator and valve 81 supplies the operating pressure to cylinder 143 while operating pressure through tube 80 is supplied to cylinder 89, and valve 94 when the motor is accelerated and, of course, fluid pressure is likewise applied to cylinder 89 and valve 94 through tubes 80 and 101 when the motor is running and the automobile is in motion. This device also provides for the operation of all gears in reverse or any number of the contained gears in reverse as may be dictated by choice.

It is to be understood the invention as herein disclosed is not limited to the details of construction shown and described, and that these may be varied widely without departing from the spirit of the invention as defined by the claims.

Figure 11:
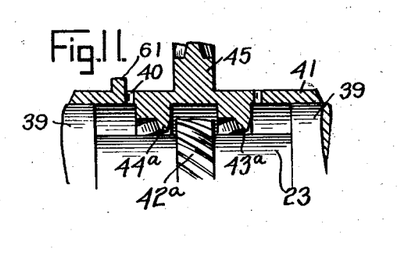
Figure 11 a modified construction of the spiral gear coupling.

In lieu of the construction of gear coupling device shown in Figure 2 the invention also contemplates using the modified form of coupling shown in Figure 11. In this instance the driven shaft 23 has a single set of male and spiral teeth 42a adapted to engage with either of the female spiral clutch teeth 43a or 44a on pinion 45. Also in lieu of the present location of spiral gear elements 45—46 and 51—52, said elements may be transposed. Thus pinions 45 and 51 with their respective coupling elements may be mounted on the countershaft 27 and spiral pinions 46 and 52 on said shaft would be mounted on driven shaft 23.

What is claimed as new is:

1. The combination with an internal combustion engine having a transmission attached thereto provided with a driven shaft having a plurality of gear coupling elements mounted thereon, of a key associated with each coupling element for moving the same into and out of engaging position, a shifting and angularly slotted locking plate connected to each of said coupling key members, pistons connected to said shifting plates, a fluid controlling system maintained under pressure from the engine for actuating said pistons to shift the plates and keys, and manually controlled means for regulating said fluid pressure system, substantially as set forth.

2. The combination with multiple gear coupling devices, of means for selectively actuating the same comprising, a key member engaging each of the coupling devices, an angularly slotted plate for each key member, each of said plates also having angular openings engaging all the keys and providing abutments operable to effect connection of its respective coupling and to withhold from action the other coupling devices, a piston connected to actuate each of said key plates, and a fluid controlling means for the several pistons, substantially as set forth.

3. The combination with a power driven shaft having a plurality of gear coupling devices mounted thereon, a key for each coupling device, a shifting and locking plate for actuating each key, a piston connected to each plate, a fluid pressure cylinder in which each piston may reciprocate, and a fluid controlling system for admitting fluid into said cylinders for moving said locking plate and said key for selectively connecting and disconnecting one of said gear coupling devices.

4. The combination with an internal combustion engine having a transmission attached thereto provided with a driven shaft having a plurality of gear coupling elements mounted thereon, a key associated with each coupling element for moving the same into and out of engaging positions, a shifting and slotted locking plate engaging each of said keys, means for shifting said slotted locking plates comprising a fluid controlling system maintained under pressure from the engine, and manually controlled means for regulating said fluid pressure system substantially as set forth.

5. The combination with multiple spiral gear coupling devices, of means for selectively actuating the same comprising a key member engaging each of the coupling devices, a plate for actuating each key member, each plate having an angular slot receiving one of the keys and also having other openings receiving the other of said keys, said plate being operable through said slots to effect connection of the coupling which is actuated by the key member received in the first said slot, said other openings being effective to withhold from action the other coupling devices, a piston connected to actuate each of said key plates, and a fluid controlling means for the several pistons, substantially as set forth.

6. The combination with an internal combustion engine for a motor vehicle having multiple spiral gear shifting devices of a fluid pressure actuating and controlling means therefor comprising, a plurality of pistons connected to actuate the gear shifting devices, cylinders within which said pistons operate, a source of fluid pressure connected to communicate with said cylinders, throttling valves in the fluid pressure system adapted to control said cylinders, a piston carrying a multiple control valve for said throttling valves, and means for actuating the valves, substantially as set forth.

7. In a fluid pressure controlling means for multiple spiral gear coupling devices, the combination of a source of pressure, a plurality of pistons and cylinders connected to actuate the respective coupling devices, a throttling valve cylinder having ports communicating with the fluid pressure system and said piston cylinders, a piston carrying a multiple control valve operating in a cylinder connected to a source of fluid pressure for regulating the flow of pressure through the throttling valve cylinder into said piston cylinders in ordered succession and means for controlling said multiple control valve piston, substantially as set forth.

EDWARD D. BIERETZ.